(12) United States Patent
Guo et al.

(10) Patent No.: US 11,499,866 B2
(45) Date of Patent: Nov. 15, 2022

(54) DEVICE FOR ACCURATELY MEASURING MECHANICAL VIBRATION BY PHOTON COUNTER

(71) Applicant: Taiyuan University of Technology, Taiyuan (CN)

(72) Inventors: Yanqiang Guo, Taiyuan (CN); Ziqing Wang, Taiyuan (CN); Xiaomin Guo, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 17/237,588

(22) Filed: Apr. 22, 2021

(65) Prior Publication Data

US 2021/0404864 A1 Dec. 30, 2021

(30) Foreign Application Priority Data

Jun. 30, 2020 (CN) .......................... 202010612306.8

(51) Int. Cl.
  *G01H 9/00* (2006.01)
(52) U.S. Cl.
  CPC .................................. *G01H 9/004* (2013.01)
(58) Field of Classification Search
  None
  See application file for complete search history.

(56) References Cited

U.S. PATENT DOCUMENTS 7,345,768 B2 * 3/2008 Joffre ....................... G01J 11/00
  356/450
9,448,162 B2 * 9/2016 Zhai ....................... G01N 21/17

* cited by examiner

*Primary Examiner* — Lisa M Caputo
*Assistant Examiner* — Nigel H Plumb
(74) *Attorney, Agent, or Firm* — WPAT, PC

(57) ABSTRACT

The invention relates to the technical field of mechanical vibration measurement, and discloses a device for accurately measuring mechanical vibration by photon counter. The device comprises a laser, an optical isolator, an adjustable attenuator, an optical fiber coupler, a single-photon counter and an FPGA post-processing module, wherein the laser enters the optical fiber coupler after passing through the optical isolator and the adjustable attenuator, and then enters into a measured object. The transmitted signal of the object to be measured returns to the optical fiber coupler and is output to the single-photon counter; the mechanical vibration of the measured object is analysed and obtained by the FPGA post-processing module connecting with the output terminal of the single-photon counter. This invention solves the problem that weak mechanical vibration is difficult to measure, and realizes microscopic vibration measurement of light-permeable objects such as nanofiber cavities by using a single photon counter.

8 Claims, 4 Drawing Sheets

DEVICE FOR ACCURATELY MEASURING MECHANICAL VIBRATION BY PHOTON COUNTER

BACKGROUND OF THE INVENTION

1. Field of the Invention

The invention relates to the technical field of mechanical vibration measurement, in particular to a device for accurately measuring mechanical vibration by photon counter.

2. Description of Related Art

In the prior art, the photon counting method utilizes the following characteristic: the electrical signal output by the photon detector is naturally discrete under weak light irradiation, and adopts pulse discrimination technology and digital counting technology to identify and extract extremely weak signals. Modern single photon counting technology has the advantages of high signal-to-noise ratio, good anti-drift, good time stability and easy computer analysis and processing. It occupies an important position in the high-tech field. It has become one of the key research topics in the optoelectronics field of developed countries. Single photon counting method uses the characteristics of natural dispersion of the output electrical signals of photon detectors under weak light irradiation, and adopts pulse discrimination technology and digital counting technology to identify and extract extremely weak signals.

Common methods for measuring vibration include mechanical measurement, electrical measurement, and optical measurement. The mechanical measurement method mainly uses the principle of lever amplification or the principle of inertia plus the principle of lever amplification. The frequency range, dynamic, linear range of this measurement method is narrow, and a certain load is added to the workpiece during the test, which affects the test result.

The electrical measurement method is to convert the vibration of the measured object into electricity, and then measure it with an electricity test instrument, but it is susceptible to electromagnetic field interference. The optical method applies the principle of optical lever, reading microscope, light wave interference principle, laser Doppler effect, etc. for measurement without electromagnetic field interference, with high measurement accuracy. So it is suitable for non-contact measurement of small mass and difficult to install sensor test piece in precision measurement, and it is applied more in calibration of sensors and vibrometers.

To sum up, in the measurement field of precision instruments, it is difficult to accurately measure the tiny vibrations of objects.

SUMMARY OF THE INVENTION

In order to overcome the shortcomings of the prior art, the technical problems to be solved by the invention are as follows: providing a device for accurately measuring mechanical vibration by photon counter to solve the problem that it is difficult to measure mechanical vibration from a microscopic level, and identifying weak signals by utilizing the characteristic of natural dispersion of electrical signals output by single photon counter so as to realize the measurement of mechanical vibration.

In order to solve the above technical problems, the invention adopts the technical scheme that the device for accurately measuring mechanical vibration by photon counter comprises a laser, an optical isolator, an adjustable attenuator, an optical fiber coupler, a single photon counter and a Field Programmable Gate Array (FPGA) post-processing module. The transmitted signal of the object to be measured is output to the single photon counter after returning to the optical fiber coupler, and the signal output end of the single photon counter is connected with the FPGA post-processing module, and the FPGA post-processing module is used for calculating the mechanical vibration of the object to be measured according to the electrical signal output by the single photon counter.

Fourier transform is carried out on the electrical signal output by the single photon counter, so as to realize the conversion from time domain to frequency domain to obtain a spectrogram, wherein the peak in the spectrogram corresponds to the vibration frequency of the object to be measured and the amplitude corresponds to the vibration amplitude of the object to be measured.

The device for accurately measuring mechanical vibration by photon counter also comprises a polarization controller which is arranged between the output end of the optical fiber coupler and the object to be measured.

The device for accurately measuring mechanical vibration by using the photon counter also comprises a data acquisition card, and the data acquisition card is used for acquiring the electric signal of the single photon counter and sending the electric signal to the FPGA post-processing module.

The sampling time of the single photon counter is 1 µs-1 ms, and the laser is a wide spectrum tunable laser.

The device for accurately measuring mechanical vibration by photon counter also comprises a glass vacuum chamber and a PZT fiber stretcher, wherein the object to be measured is a nanofiber chamber, and both the nanofiber chamber and the PZT fiber stretcher are arranged in the glass vacuum chamber, and the PZT fiber stretcher is used for stretching the nanofiber chamber Further, the vacuum level of the vacuum chamber is maintained at $10^{-11}$ Torr.

The optical coupler (4) is a 2×2 optical coupler with the coupling ratio of 1:99.

Beneficial Effects:

(1) The invention provides a device for accurately measuring mechanical vibration by using photon counter, uses FPGA post-processing module for frequency division and counting, performs data operation and processing by Fourier transform, converts time-domain signal into signal under corresponding frequency, realizes real-time accurate measurement of nano fiber cavity vibration of the object to be measured, and the measurement accuracy reaches µm level. Compared with the traditional data acquisition system, the data acquisition system based on FPGA has a series of advantages, such as short development cycle, high integration, high working frequency, ns level clock delay, field repeated programming, flexible programming configuration and so on.

(2) The invention utilizes the characteristics of single photon counter to output natural discrete electrical signal under weak light signal, adopts pulse screening counting and digital counting technology to identify weak signal, and obtains corresponding photon time spectrum density distribution by Fourier transform of photon time obtained, so as to accurately analyze vibration of target object.

(3) The invention adopts a glass vacuum gas chamber. The existence of the glass vacuum gas chamber reduces the influence of the background noise and external interference on the vibration of the tapered fiber under the tension of the PZT fiber stretcher, makes the experiment more controllable, and further reduces the influence of the background noise.

SYMBOLS

Wide spectrum tunable laser; 2—ISO optical isolator; 3—Tunable attenuator; 4—Fiber coupler; 5—Polarization controller; 6—Nanofiber cavity; 7—PZT fiber stretcher; 8—Glass vacuum gas chamber; 9—Single photon counter; 10—FPGA post-processing module.

DETAILED DESCRIPTION OF THE PREFERRED EMBODIMENTS

In order to make the purpose, technical scheme and advantages of the embodiments of the present invention clearer, the technical scheme of the embodiments of the present invention will be described clearly and completely below. Obviously, the described embodiments are part of the embodiments of the present invention, not all of them. Based on the embodiments of the present invention, all other embodiments obtained by ordinary technicians in the field without creative labor belong to the scope of protection of the present invention.

Figure 1:
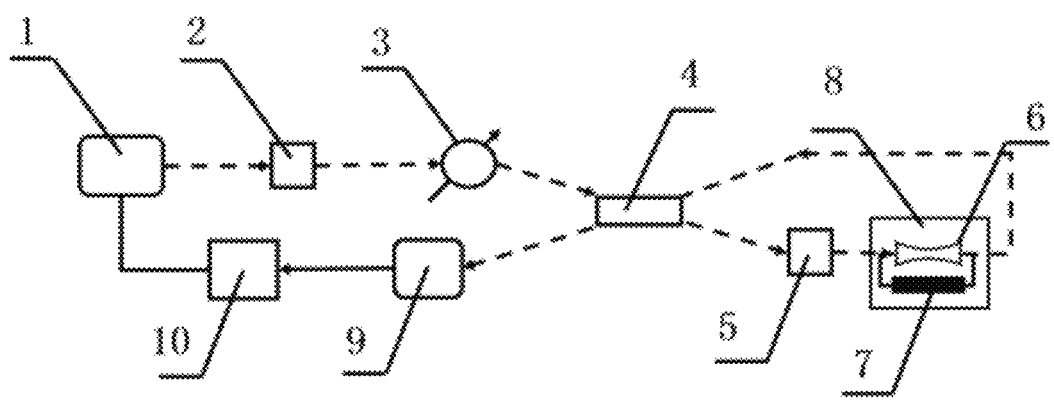
FIG. 1 is the structural diagram of the device for accurately measuring mechanical vibration by photon counter provided by the embodiment of the invention, in which the solid line is of electrical connection and the dotted line is of optical connection.

As shown in FIG. 1, the example of the present invention takes a nanofiber cavity as an example, and provides a device for accurately measuring mechanical vibration by photon counter. The device comprises a laser 1, an optical isolator 2, an adjustable attenuator 3, a fiber coupler 4, a polarization controller 5, a glass vacuum chamber 8, a PZT fiber stretcher 7, a single photon counter 9 and an FPGA post-processing module 10. The nanofiber cavity 6 to be tested and the PZT fiber stretcher 7 are both arranged in a glass vacuum chamber 8, and the PZT fiber stretcher 7 is used for stretching the nanofiber cavity 6.

The light emitted by the laser 1 enters the fiber coupler 4 after passing through the optical isolator 2 and the adjustable attenuator 3, and then enters the nanofiber cavity 6 to be measured in the glass vacuum chamber 8 after passing through the fiber coupler 4 and the polarization controller 5. The transmitted signal of the nanofiber cavity 6 is returned to the fiber coupler 4 and then output to the single photon counter 9, and the signal output end of the single photon counter 9 is connected with the FPGA post-processing module 10. The FPGA post-processing module 10 is used for calculating the mechanical vibration of the nanofiber cavity 6 according to the electrical signal output by the single photon counter 9. The polarization controller 5 is an optical fiber polarization controller, which is arranged between the output end of the optical fiber coupler 4 and the nanofiber cavity 6 to be measured, and is used for adjusting the polarization state of light entering the nanofiber cavity 6 to be measured.

Specifically, in this embodiment, the glass vacuum chamber is a cuboid or cube structure made of quartz, and the main body is made of glass material with very low coefficient of thermal expansion. The glass vacuum chamber is connected with the vacuum pump, so that the vacuum pressure of the glass vacuum chamber is maintained below 10-7 PA, and the vacuum degree of the vacuum chamber is maintained at the order of $10^{-11}$ Torr.

Further, in this embodiment, the laser 1 is a wide spectrum tunable laser, which is connected with a computer to realize the trigger and control of the laser, so that the laser emits laser with adjustable wavelength. The computer adjusts the laser wavelength by changing the corresponding driving current of the laser. The specific range of wavelength adjustment is 720 nm~1060 nm.

The optical isolator 2 is used to prevent the reflection of the optical path and form a unidirectional channel of the optical path to avoid the interference of the reflected light to the laser 1. The laser is coupled to the 1:99 fiber coupler 4 through the optical isolator 2 and the adjustable attenuator 3. The laser is divided into two channels through the fiber coupler 4. The stronger one is changed by the polarization controller 5, and then incident into the nanofiber cavity 6.

After reflected by the nanofiber cavity 6, the optical signal returns to the fiber coupler 4 by the fiber, and then 1% of the optical signal is coupled into the single photon counter through the fiber coupler 4, and then the optical signal is processed through the FPGA post-processing module. By using the fiber coupler 4 with the splitting ratio of 1:99, the transmitted light of the nanofiber cavity 6 can be attenuated, and the separated pulse with obvious step signal can be received by the single photon counter 9.

Furthermore, the device for accurately measuring mechanical vibration by using a photon counter provided by this embodiment further comprises a data acquisition card and acquisition software.

In this embodiment, LabVIEW programming language and a multi-channel data acquisition card are applied to realize data acquisition and analysis. NI PCI-6251 produced by National Instruments Company of America is selected as the data acquisition card, which has 16-bit multi-channel accuracy of 1 MS/s, single-channel accuracy of 1.25 MS/s, and can provide analog input and output at the same time. The data acquisition card is used to collect the electrical signal of the single photon counter 9 and send it to the FPGA post-processing module 10.

Specifically, in this embodiment, the FPGA post-processing module 10 calculates the mechanical vibration of the nanofiber cavity 6 according to the electrical signal output by the single-photon counter 9 by performing Fourier transform on the electrical signal output by the single-photon counter 9, so as to realize the conversion from time domain to frequency domain to obtain a spectrogram, wherein the peak in the spectrogram corresponds to the vibration frequency of the nanofiber cavity and the amplitude corresponds to the vibration amplitude of the nanofiber.

Specifically, in this embodiment, the PZT fiber stretcher 7 is connected with the nanofiber cavity 6 for stretching the nanofiber cavity to simulate different vibration states of the nanofiber cavity. In this embodiment, in order to reduce the vibration of the nanofiber cavity, firstly, the nanofiber cavity is completely loosened, and then the nanofiber cavity is stretched in a single step mode, and the length of the fiber cavity is stretched from 0-20 μm (step size: 0-140 step size), and the frequency imbalance is about 450 GHz.

Specifically, in this embodiment, the single photon counter is used to check the vibration of the nanofiber cavity in different time periods (1 μs-1 ms), and the collected fluorescence is coupled into the single photon detector. When there is no optical signal, the background count rate detected by the detector is about 10 counts/50 ms, which includes both the number of secret records of the detector and the stray light of the background. When the optical signal is collected, the background count rate is about 80 counts/50 ms. The photoelectric signal is a discrete sharp pulse with obvious step signal. The corresponding Fourier transform program is written by computer to complete the Fourier transform from time domain to frequency domain to detect the vibration frequency, and the vibration of the nanofiber cavity is reflected by the vibration of the nanofiber cavity at the corresponding frequency. When we hold the stretch at 140 steps, check the vibration and scan the profile. It is found that the diameter of the dipole well is about 3.4 μm and the vibration frequency is about 500 Hz.

Figure 2:
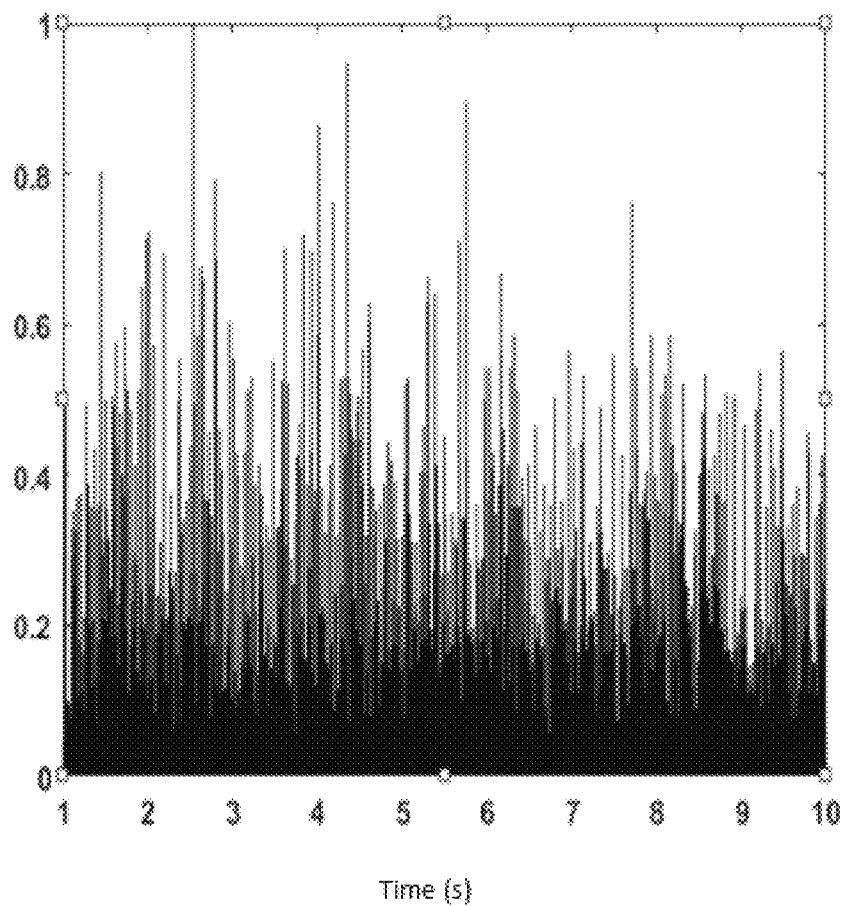
FIG. 2 is the fluorescence signal diagram obtained by counting by counter when stretching is 0 step and sampling resolution time is 1 ms in the embodiment of the invention.
Figure 3:
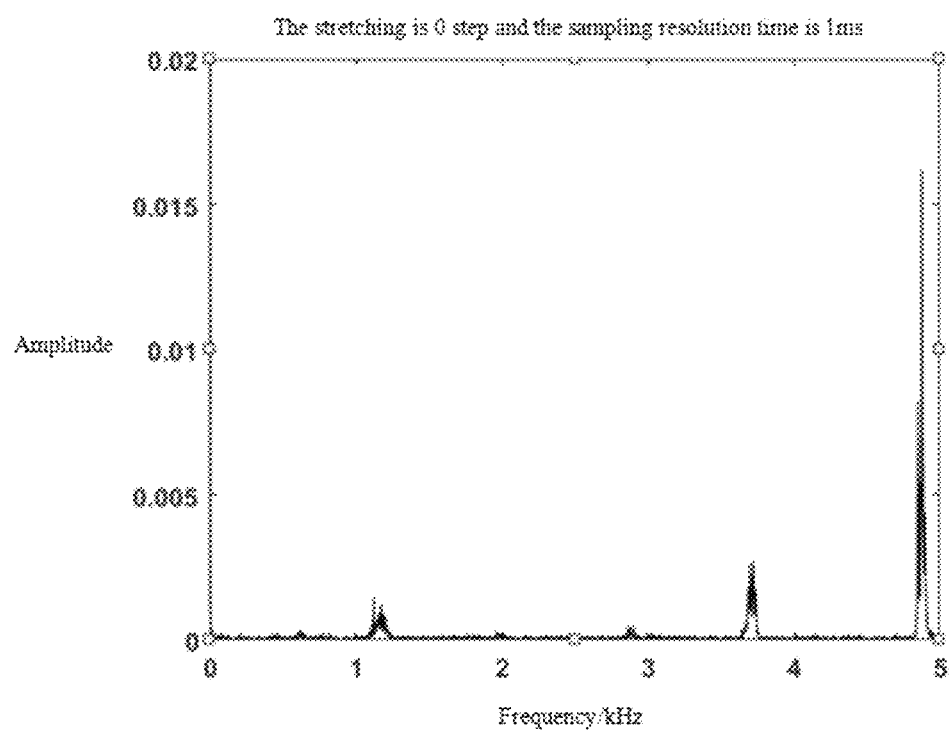
FIG. 3 is the spectrum diagram after Fourier transform of the photon signal obtained by statistics in the embodiment of the present invention when the stretching holding step is 0 and the sampling resolution time is 1 ms.

As shown in FIG. 2-5, the test data diagram obtained by the embodiment of the invention is shown. FIG. 2 is the fluorescence signal diagram obtained by statistics when the sampling resolution time is 1 ms when the pull-up is 0 step. After Fourier transform, the fluorescence signal in FIG. 2 is processed by Fourier transform to complete the transformation from time sequence to frequency domain, that is, the spectrum diagram shown in FIG. 3 can be obtained.

Figure 4:
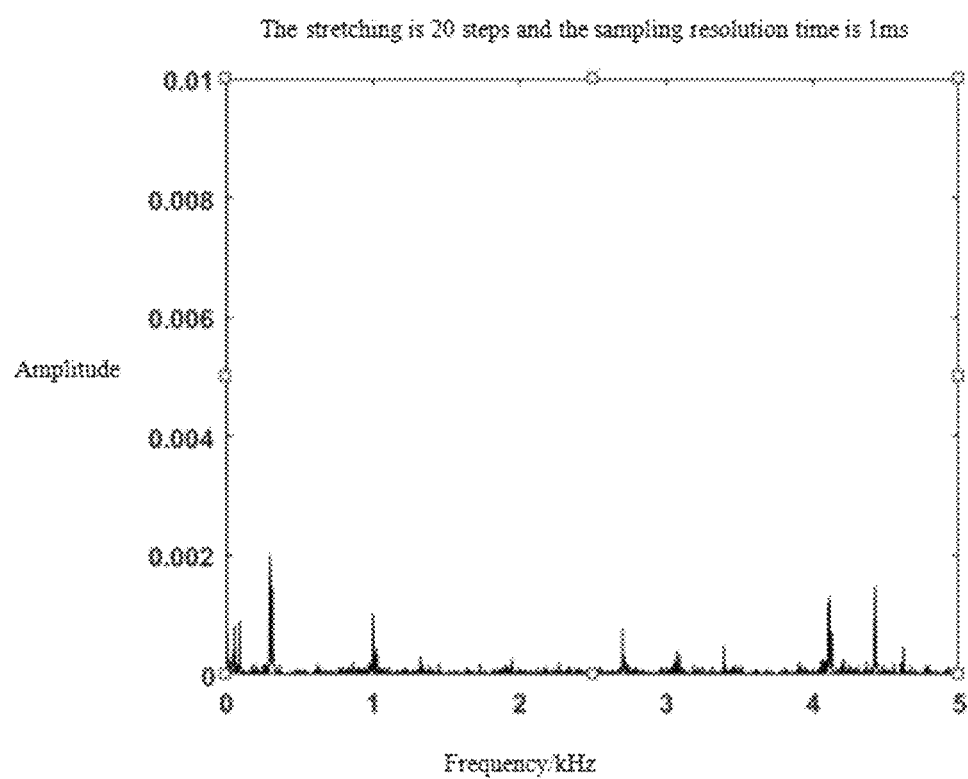
FIG. 4 is the spectrum diagram after Fourier transform of the photon signal obtained by statistics in the embodiment of the invention when the stretching holding is 20 steps and the sampling resolution time is 1 ms.
Figure 5:
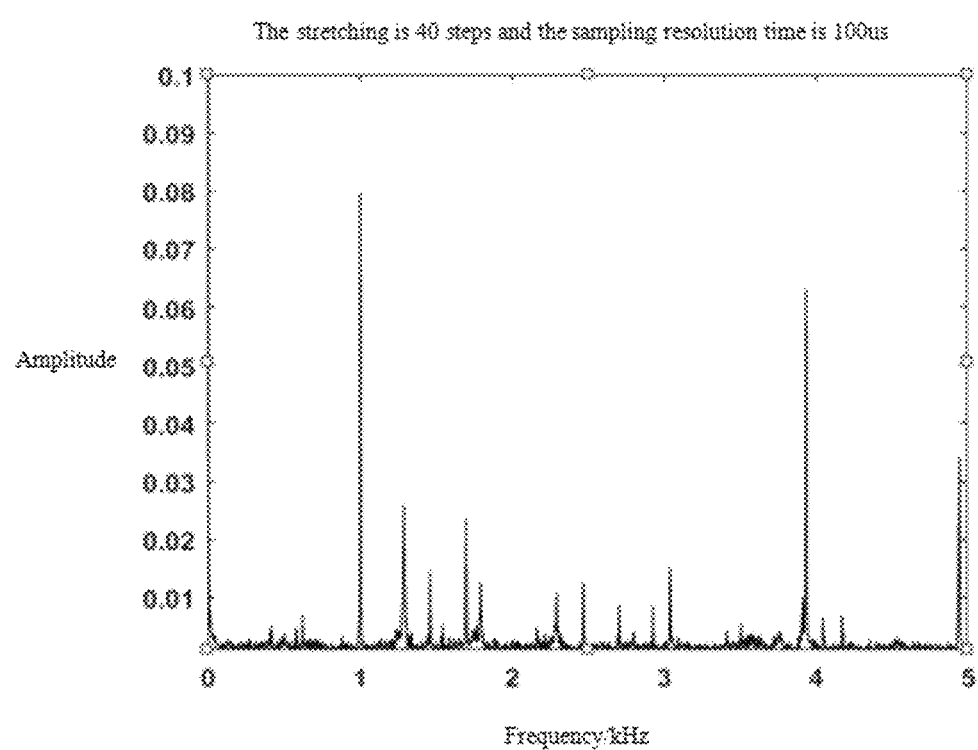
FIG. 5 is the spectrogram after Fourier transform of photon signals obtained by statistics when stretching is maintained for 40 steps and the sampling resolution time is 100 μs in an embodiment of the present invention.

FIG. 4 is the spectrum diagram after Fourier transform of photon signal obtained by statistics when stretching and holding 20 steps and sampling resolution time is 1 ms. FIG. 5 is the spectrum diagram after Fourier transform of the photon signal obtained by statistics when the stretching and holding time is 40 steps and the sampling resolution time is 100 μs.

The invention provides a device for accurately measuring mechanical vibration by using a photon counter, which utilizes the characteristics of a single photon counter to output natural discrete electrical signals under weak light signals. The device applies the pulse discrimination counting and digital counting technology to identify the weak signal. With the Fourier transform of the photon time obtained, the corresponding photon time spectrum density distribution can be obtained, and the vibration of the target can be accurately analyzed.

In addition, the FPGA post-processing module is used for frequency division and counting, as well as data calculation and processing. The real-time and accurate measurement of the vibration of the object to be measured, such as the nanofiber cavity, is realized, and the measurement accuracy reaches μm level.

Compared with the traditional data acquisition system, the data acquisition system based on FPGA has the advantages of short development cycle, high integration, high working frequency, NS clock delay, field repeated programming and flexible programming configuration.

Finally, it should be noted that the above embodiments are only used to illustrate the technical solutions of the present invention, but not to limit them. Although the present invention has been described in detail with reference to the foregoing embodiments, those of ordinary skill in the art should understand: It is still possible to modify the technical solutions described in the foregoing embodiments, or to equivalently replace some or all of the technical features. These modifications or replacements do not cause the essence of the corresponding technical solutions to deviate from the scope of the technical solutions of the embodiments of the present invention.

What is claimed is:

1. A device for accurately measuring mechanical vibration by a photon counter has the following characteristics: it comprises a laser, an optical isolator, an adjustable attenuator, an optical fiber coupler, a single photon counter and a Field Programmable Gate Array (FPGA) post-processing module; the light emitted by the laser enters the optical fiber coupler after passing through the optical isolator and the adjustable attenuator, then enters into the object to be measured through the optical fiber coupler; the transmitted signal of the object to be measured returns to the optical fiber coupler and is output to the single photon counter, and the signal of the single photon counter is output; the FPGA post-processing module is used for calculating the mechanical vibration of the object to be measured according to the electrical signal output by the single photon counter.

2. The device for accurately measuring mechanical vibration by photon counter according to claim 1, wherein the FPGA post-processing module calculates the mechanical vibration of the object to be measured according to the electrical signal output by the single photon counter, and a method of calculating the mechanical vibration of the object to be measured is as follows:

fourier transform the electrical signal output by the single photon counter to realize the conversion from the time domain to the frequency domain to obtain the spectrum diagram; the peak in the spectrum diagram corresponds to the vibration frequency of the object to be tested, and the amplitude corresponds to the vibration amplitude of the object to be tested.

3. The device for accurately measuring mechanical vibration by photon counter according to claim 1, wherein it also comprises a polarization controller arranged between the output end of the optical fiber coupler and the object to be measured.

4. The device for accurately measuring mechanical vibration by photon counter according to claim 1, wherein a data acquisition card is also included, which is used to collect the electrical signal of the single-photon counter and send it to the FPGA post-processing module.

5. The device for accurately measuring mechanical vibration by photon counter according to claim 1 has the following characteristics: the sample time of the single photon counter is 1 μs-1 ms, and the laser is a broadband tunable laser.

6. The device for accurately measuring mechanical vibration by photon counter according to claim 1 with the following characteristics: it also comprises a glass vacuum chamber and a PZT optical fiber stretcher, wherein the object to be measured is a nanofiber cavity, and both the nanofiber cavity and the PZT optical fiber stretcher are arranged in the glass vacuum chamber, and the PZT optical fiber stretcher is used for stretching the nanofiber cavity.

7. According to the device for accurately measuring mechanical vibration by photon counter described in claim 6, the vacuum level of the glass vacuum chamber is maintained at $10^{-11}$ Torr.

8. The device for accurately measuring mechanical vibration by photon counter according to claim 1 has the following characteristics: the optical coupler is a 2×2 optical coupler with the coupling ratio of 1:99.

* * * * *